United States Patent [19]

Smith

[11] Patent Number: 5,000,204

[45] Date of Patent: Mar. 19, 1991

[54] EYEGLASS CLEANING KIT AND METHOD OF CLEANING EYEGLASSES

[76] Inventor: Randy E. Smith, 9171 El Rito Dr., Villa Park, Calif. 92667-2240

[21] Appl. No.: 484,168

[22] Filed: Feb. 23, 1990

[51] Int. Cl.⁵ .............................................. B08B 7/00
[52] U.S. Cl. .......................................... 134/6; 206/5; 206/38; 206/812; 15/104.93; 220/375
[58] Field of Search .................... 206/5, 38, 38.1, 223, 206/233, 234, 235, 528, 530, 540, 812; 15/214, 235, 104.93; 220/375; 215/306; 134/6, 21

[56] References Cited

U.S. PATENT DOCUMENTS

| | | |
|---|---|---|
| 399,450 | 3/1889 | Thorpe . |
| 2,166,570 | 7/1939 | Panissidi . |
| 2,554,630 | 5/1951 | Miller . |
| 2,908,923 | 10/1959 | Schlechter . |
| 4,818,134 | 4/1989 | Tsai . |

*Primary Examiner*—David T. Fidei
*Attorney, Agent, or Firm*—Jackson & Jones

[57] ABSTRACT

A portable eyeglass cleaning kit is provided with a chemically treated pig skin chamois housed within a small portable plastic storage case. The chamois is treated with a chemical mixture for more efficient eyeglass lens cleaning. The chemical fixture serves as a fungicide for inhibiting the growth of mildew while the chamois is stored in the case. The chamois can be maintained moistened in the air-tight storage case or dry to be moistened when needed. The storage case is affixed with a detachable chain which enables the unit to serve as a key chain or be attachable to one.

5 Claims, 2 Drawing Sheets

EYEGLASS CLEANING KIT AND METHOD OF CLEANING EYEGLASSES

BACKGROUND OF THE INVENTION

1. Field of the Invention

This invention relations to an eyeglass cleaning kit consisting of a chemically treated animal skin chamois housed Within a small, portable airtight compartment and method of using the same. The chamois is specially treated to eliminate mildew and maintain a certain degree of moisture content for an extended period of time.

2. Description of the Prior Art

Many devices and methods have been used in the past to clean eyeglasses with the most common being paper tissues, and cotton fabrics. These elements however often leave fibers on the lens to obstruct the wearer's view or can even scratch the lens itself. Special tissues, cloths and chamois have been developed to prevent loose fibers and marring of the lenses. The U.S. Pat. No. 399,450 issued to Thorpe on Mar. 12, 1889, shows an early concept of an eyeglass polisher. Miller's device, shown in U.S. Pat. No. 2,554,630, dated May 29, 1951, illustrates improved eyeglass wipes capable of cleaning both surfaces of the lens simultaneously while also eliminating loose fibers, and preventing lens marring. Panissidi was issued U.S. Pat. No. 2,166,570, dated Aug. 8, 1938, for a chemical process for treating cloth with a metallic oxide for use as a glass lens cleaner. Panissidi provides an improved dry, cloth glass cleaning wipe which prevents streaks and marring of the lens. Mechanical eyeglass cleaning devices having dual arms and pads for wiping both sides of the lenses at one time have also been developed. The Schlechter device, granted on Oct. 20, 1959, U.S. Pat. No. 2,908,923, is representative of many dual surface cleaning devices currently available. The effectiveness of these cleaning elements and devices is generally improved when treated with some sort of cleaning fluid. These fluids often vary from simple water to chemical formulas. Using a detergent helps prevent filming and streaking. Anti-static solutions can help prevent the adherence of dust build-up. However, it is inconvenient to carry cleaning fluids along with the cleaning devices, or to store the treated wipes for even a short length of time without them drying out or developing mildew. Attempting to overcome fluid storage problems, A. Tsai was issued U.S. Pat. No. 4,818,134, for a somewhat complex lens cleaning pen having a cleaning fluid reservoir. Tsai's reservoir and pen has a connecting cleaning tip and a separate compartment for a cleaning wipe and a screw driver. Leakage of the fluid reservoir is always an unfortunate possibility and the fluid must periodically be replaced as it is used. Since the lens cleaning pen is designed to be attachable to a pocket of the user by a small clip, the user must make a conscious effort to remember to remove the device with every clothing change. There are also no means provided to prevent the dampened wipe from developing mildew while stored in the pen housing.

I therefore feel I have developed an eyeglass cleaning kit which overcomes the previously mentioned disadvantages and provides new and useful benefits not found in the past art.

SUMMARY OF THE INVENTION

According to the present invention, the cleaning kit includes a small oval towelette, comprised of a section of chamois, specifically pig skin leather, folded compactly for storage inside a small plastic air-tight carrying case. Pig skin leather is especially suited for this purpose since it is soft and pliable yet is extremely strong and durable and can be reused for an extended period of time. The skin also contains small pores which help to maintain an even overall moisture content. Although pig skin is preferable, other types of chamois can also be substituted. The chamois is treated with a mixture of water and isopropyl alcohol which serves as an improved cleaning fluid, eliminating film and streaks on eyeglass lenses. The alcohol also serves as a fungicide which prevents the growth of mildew which would grow with pure water. The solution with which the chamois is treated can be applied in a liquid form with the chamois provided in a pre-moistened state, or the chamois may be provided dry, requiring the user to treat it with the cleaning solution when purchased. To use the chamois for cleaning, it is transversely folded in half and used to wipe both surfaces of the lens at one time. The chamois is folded several times to reduce the size for storage in the portable plastic case. The plastic storage case consists of a short tubular housing and a snap on lid attached by a living hinge. A detachable chain, looped around the living hinge, is provided for attachment of the cleaning kit onto the users existing key chain. If desired, the kit can be used as the key chain itself, attaching the keys to the detachable chain. Although shown tubular in shape, the storage case can be structured in almost any conceivable design as long as its small size is retained. By applying the cleaning kit to the user's key chain he will generally have the kit ready at hand, or will more than likely know where to find it. This basically eliminates the need to consciously remember to transfer the kit from one place to another or to find a convenient storage place for it when not in use. The cleaning kit of the immediate invention being contained in a small sized plastic case, is highly portable, convenient to use, and easily stored.

It is therefore a principal object of the invention to provide an eyeglass cleaning kit having a chemically treated animal skin chamois housed within an air-tight container which maintains the moisture content of the chamois for an extended period of time without developing mildew.

Another object of the invention is to provide an eyeglass cleaning kit which is small, compact, highly portable, and easily stored.

A further object of my invention is to provide an eyeglass cleaning kit which is attachable to a key chain or capable of serving as the key chain itself which helps eliminate misplacement problems.

An even further object of the invention is to provide an eyeglass cleaning kit which may be used repeatedly over an extended period of time.

Other objects of the invention will become apparent from reading the following specification referenced to accompanying drawings by numerated parts described and illustrated.

DESCRIPTION OF THE PREFERRED EMBODIMENT

Figure 1:
FIG. 1 is a top view of the pig skin chamois.
Figure 2:
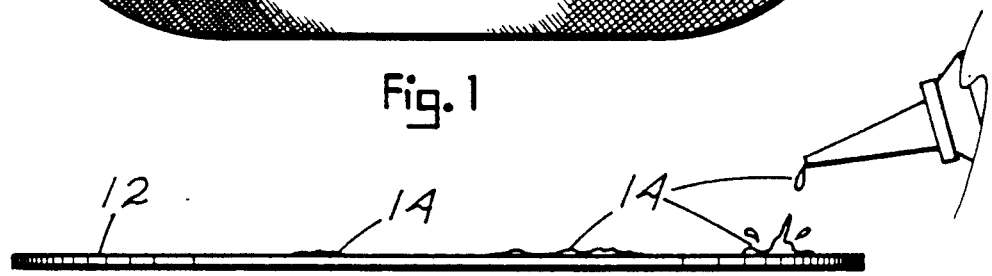
FIG. 2 is a side view thereof.
Figure 3:
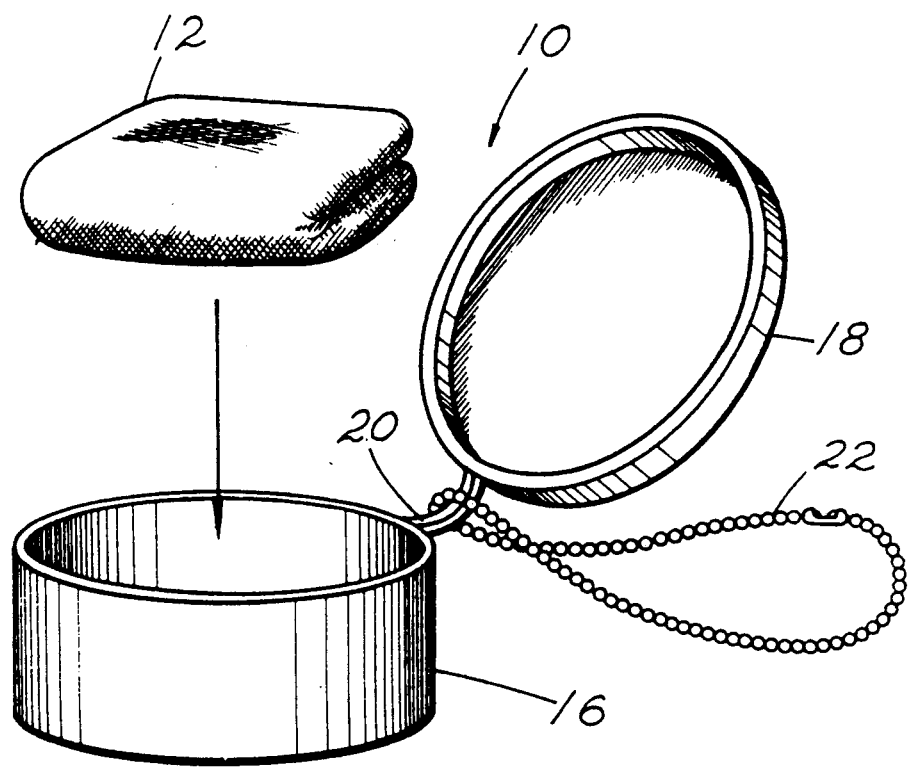
FIG. 3 is a perspective view of the chamois folded and positioned for insertion into the storage case. The detachable chain is shown looped around the hinge.

Referring now to the drawings, FIGS. 1 through 4, where the invention is illustrated. Eyeglass cleaning kit 10, according to the invention as shown in FIG. 3, is comprised of a reuseable flat towelette or chamois 12, shown in FIGS. 1 and 2 which is folded and housed inside of storage case 16, shown in FIG. 3. Chamois 12 is a thin flat oval section of pig skin leather approximately four and a half inches in length and two inches in width. Although pig skin is preferable, other types of animal leather can be used. Chamois 12 has been treated with a special chemical 14 consisting of a combination of water and isopropyl alcohol. Chamois 12 may be sold dry, requiring user 28 to moisten chamois 12 with chemical 14 when purchased. Chamois 12 can also be supplied premoistened with chemical 14 and ready for use. Fluid treatment by chemical 14 not only moistens chamois 12 for more efficient cleaning of lens 26 of eyeglasses 24, but helps remove grease and prevents streaking. More importantly the isopropyl alcohol helps eliminate the development of mildew when chamois 12 is stored moistened for an extended period in storage case 16. Storage case 16 consists of a one-piece plastic short tubular housing having an annular snap-on lid 18 attached by living hinge 20. When lid 18 is attached and in the closed position, storage case 16 is generally airtight or leak-proof. Looped around living hinge 20 is detachable chain 22 which can be used to attach storage case 16 to an existing key chain. The present invention can also be used as a key chain in itself, with keys being attached directly onto detachable chain 22.

Figure 4:
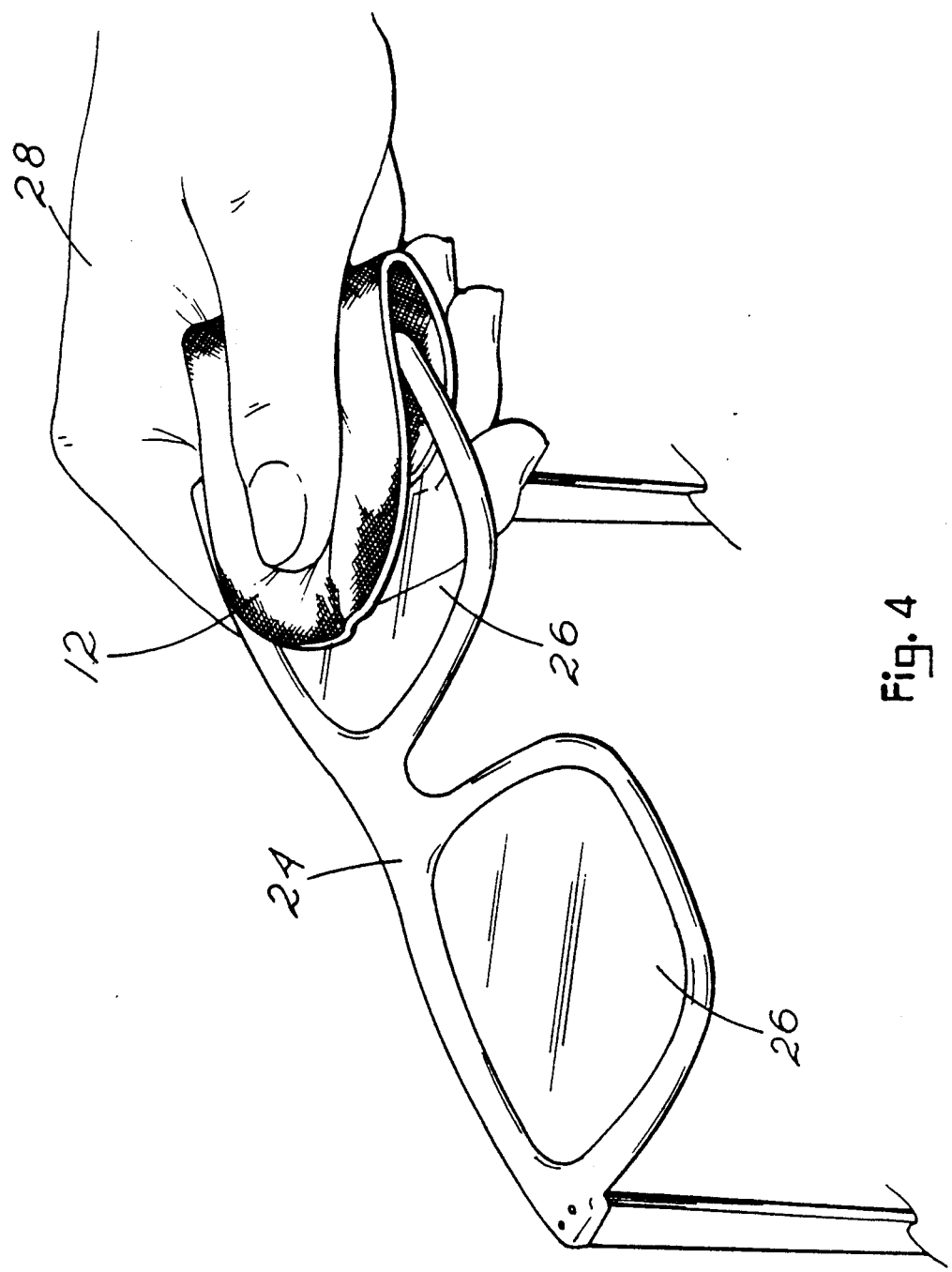
FIG. 4 shows the chamois being used to clean the lens of the eyeglasses.

In use, see FIG. 4, user 28 removes chamois 12 from storage case 16, unfolds chamois 12 and then folds it once transversely. One lens 26 of eyeglasses 24 is positioned between both folded layers of chamois 12, as shown in FIG. 4, and user 28 wipes both sides of lens 26 simultaneously. Chamois 12 is then refolded to fit back into storage case 16 for reuse at a later date. Should chamois 12 become dehydrated for some reason, a small amount of chemical 14 can be added to restore the moisture content. Chamois 12 can also be machine washed and reused, although treatment by chemical 14 will need to be repeated after washing. The water and isopropyl alcohol formula of chemical 14 can be supplied separately as an optional accessory item for occasional replenishment of the chemical 14 content of chamois 12. As illustrated in FIG. 3, eyeglass cleaning kit 10 can now be easily transported by user 28 on his existing key chain or by serving as the key chain itself with storage case 16 serving as a fob.

Although the eyeglass cleaning kit 10 and method of using the same according to the immediate invention has been described in the foregoing specification with considerable details, it is to be understood that modifications may be made to the invention which do not exceed the intended scope of the appended claims and modified forms of the present invention done by others skilled in the art will be considered duplication of this invention when those modified forms fall within the claim scope of this invention.

What I claim as my invention is:

1. A method of cleaning eyeglasses comprising:
   (a) providing a short one-piece plastic tubular housing having an annular snap-on lid attached to the housing by a living hinge so that when the lid is in the closed position the housing is substantially air tight and leak proof;
   (b) providing a flat planar section of chamois;
   (c) wetting the chamois section with a cleaning agent and a fungicide;
   (d) folding the chamois section upon itself so that it will fit within the housing;
   (e) placing the folded chamois section within the housing;
   (f) placing the lid on the housing to prevent the evaporation of the cleaning agent from the chamois section;
   (g) opening the lid of the housing;
   (h) removing the chamois section from the housing;
   (i) folding the chamois section at least once transversely;
   (j) cleaning one or both lenses of eyeglasses by positioning a lens between the folded chamois section and wiping the chamois against both sides of the lens;
   (k) refolding the chamois section;
   (l) inserting the folded chamois section back into the housing the reuse at a later time; and
   (m) replacing the lid on the housing.

2. The method of cleaning eyeglasses of claim 1 wherein the chamois section is wetted with alcohol and water.

3. The method of cleaning eyeglasses of claim 2 wherein the chamois is made of pigskin.

4. The method of cleaning eyeglasses of claim 3 wherein the chamois is treated with a solution of about ten parts of water to each part of alcohol.

5. The method of cleaning eyeglasses of claim 4 wherein the alcohol is isopropyl alcohol.

* * * * *

UNITED STATES PATENT AND TRADEMARK OFFICE
CERTIFICATE OF CORRECTION

PATENT NO. : 5,000,204
DATED : March 19, 1991
INVENTOR(S) : Randy E. Smith

It is certified that error appears in the above—identified patent and that said Letters Patent is hereby corrected as shown below:

Column 1, line 7, "relations" should read --relates--.

Column 1, line 9, "Within" should read --within--.

Signed and Sealed this

First Day of March, 1994

Attest:

BRUCE LEHMAN

Attesting Officer     Commissioner of Patents and Trademarks